2,235,620

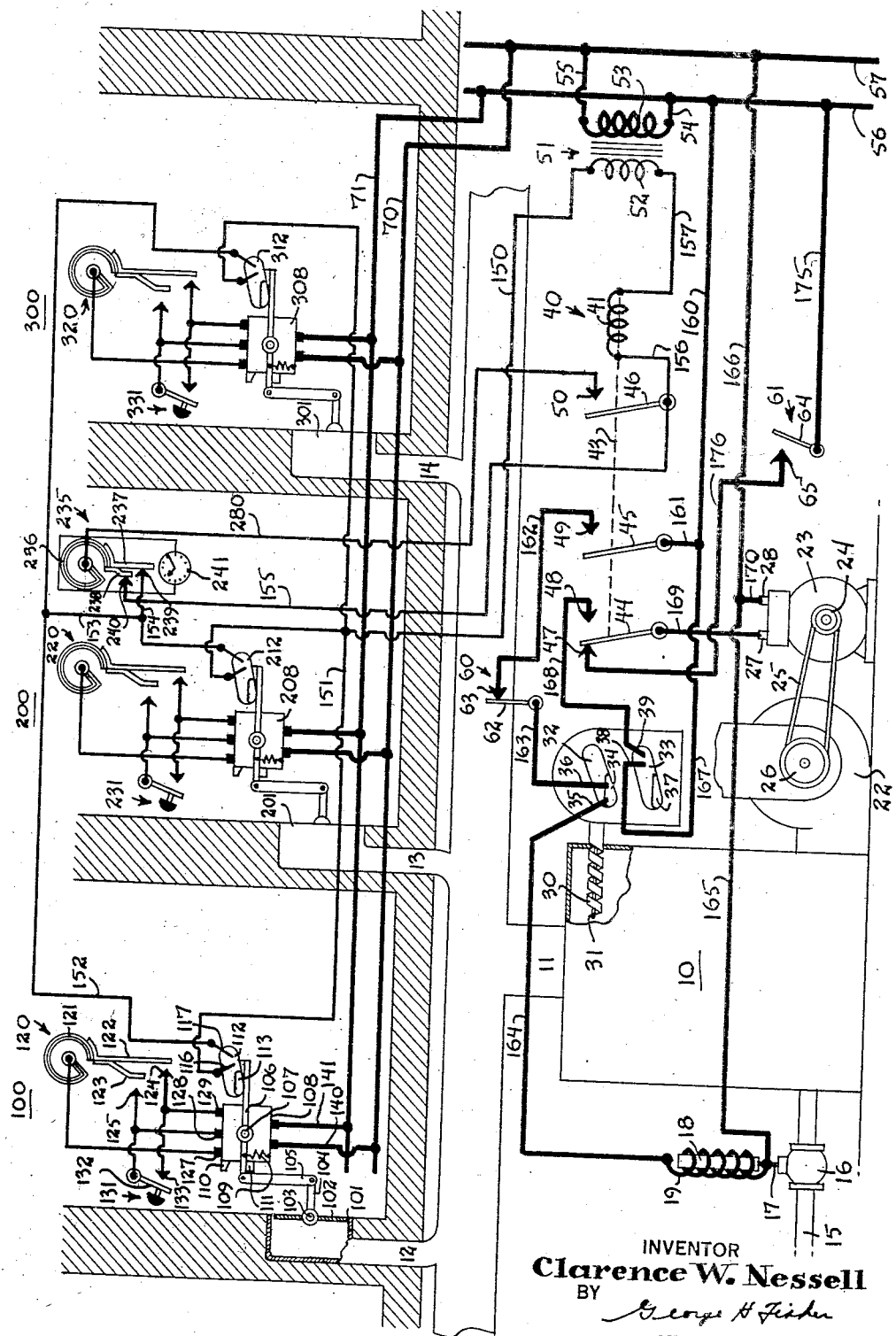
March 18, 1941.  C. W. NESSELL  2,235,620
TEMPERATURE CONTROL SYSTEM
Filed Nov. 19, 1937
INVENTOR
Clarence W. Nessell
BY
George H Fisher
ATTORNEY Patented Mar. 18, 1941

UNITED STATES PATENT OFFICE 2,235,620

TEMPERATURE CONTROL SYSTEM

Clarence W. Nessell, Dayton, Ohio, assignor to Minneapolis-Honeywell Regulator Company, Minneapolis, Minn., a corporation of Delaware Application November 19, 1937, Serial No. 175,455

4 Claims. (Cl. 236—11)

This invention relates to a temperature control system and more particularly to a system for circulating a temperature changing medium such as heated air through a plurality of spaces or zones in the winter for heating purposes, and for circulating unheated air through said zones in the summer-time for cooling purposes.

In a heating system wherein a plurality of zones are to be heated in a large building, it is well known that more effective control is possible if each zone is provided with a thermostat controlling the amount of heat supplied thereto, than if the whole building is controlled by a single thermostat located at any desired point. It is also well known that a building can be more economically heated if a lower temperature is maintained throughout the building during those times that the building is unoccupied than is maintained while the building is occupied.

While various systems have been used to secure day-night operation of a heating system wherein individual controls are provided in each zone, one method that is quite satisfactory and requires a minimum amount of equipment is to provide a thermostat in each zone to control the building during that portion of the day that the building is occupied, and to provide a single clock thermostat located at a suitable location in the building to assume control of the entire building at a predetermined time during the day to maintain lower temperatures throughout the building while the building is unoccupied. This system of control is very satisfactory since it is unnecessary to closely regulate the temperature of any particular zone while the building is unoccupied, as long as the temperature of the building as a whole is reduced sufficiently to effect a saving in the heating costs.

The clock thermostat will be located in a part of the building that is representative of the whole building rather than a portion of the building that requires considerably more or considerably less heat than the rest of the building, so that the building as a whole will be maintained at the temperature called for by the clock thermostat during the time that the building is unoccupied.

In a system wherein the building is heated by hot air circulation in the winter-time, it is often desirable to circulate unheated air throughout the building in the summer-time so that a cooling effect will be exerted on the occupants of the building during hot weather. It is usual to provide thermostatic control over the circulating means so that the unheated air will be circulated only when the temperature of the building is above a certain predetermined value.

It is also often desirable, where the building is heated by other means such as hot water, to circulate cold water or brine through the radiators in the summer in order to effect a cooling of the building. Accordingly, while my system is shown and described more particularly with reference to a warm air heating system, it is to be understood that it is also applicable to other types of heating systems.

I have devised a system wherein the clock thermostat which controls the heating plant during the night shut-down period may also be utilized to control the circulation of temperature changing medium during the summer-time, with the use of a minimum of extra equipment. My invention is accordingly particularly directed to a heating system of the type above set forth in combination with means for converting it into a system for circulating unheated air or other cooling medium wherein a minimum of equipment is required.

It is therefore an object of my invention to provide a system for circulating heated air, hot water or the like throughout a building, wherein the temperature of each portion of the building is controlled during the times that the building is occupied by a thermostat located in each zone of the building, wherein a lower temperature is maintained throughout the building by means of a single clock thermostat during the portion of the day that the building is unoccupied, and wherein the same clock thermostat controls the circulating means during warm weather, when it is desired to circulate unheated air or other cooling medium throughout the building, to cause operation of the circulating means only when the temperature of the zone in which the clock thermostat is located, is above a predetermined value.

Other objects will become apparent upon an examination of the specification, claims and appended drawing, in which The single figure represents a schematic view of a preferred form of my invention.

Referring more particularly to the drawing, a warm air furnace is represented by the reference character 10, this furnace being provided with a warm air duct 11 leading to branch ducts 12, 13, and 14 which conduct air into the various zones to be controlled.

This furnace may be heated in any conventional manner, but for purposes of illustration it is shown provided with a gas line 15 which is controlled by a valve 16. Valve 16 is provided with a valve stem 17 terminating in an armature 18 located within a solenoid 19. Energization of solenoid 19 causes an upward pull to be exerted on the armature 18 and causes the valve 16 to be opened to admit gas to the furnace 10. Upon deenergization of solenoid 19, the valve moves to closed position wherein the supply of gas to the furnace is cut off.

A blower 22 is provided for circulating air through the heating chamber of the furnace 10 through the ducts 11, 12, 13, 14, etc. and through the spaces or zones to be heated. A motor 23 is provided for driving the blower 22, the motor being provided with a pulley 24 which is connected by means of a belt 25 to a pulley 26 on the blower shaft. Motor 23 is provided with terminals 27 and 28 which are connected to a suitable source of power as will be later described when operation of the blower 22 is desired.

Located in the heating chamber of the furnace is a bimetallic element 30 of conventional form which is connected by means of a rod 31 to switches 32 and 33 to actuate the same in response to temperature changes in the heating chamber of the furnace in a well known manner. Switch 32 includes a mercury element 34 and contacts 35 and 36 which are electrically connected by means of the element 34 when the switch is in the position illustrated. When the temperature of the heating chamber rises to an excessively high value, switch 32 will be tilted by the bimetallic element 30 acting through the rod 31 to a position wherein the mercury element 34 flows out of engagement with the contacts 35 and 36, thus breaking the circuit through these contacts. The switch 33 includes a mercury element 37 and contacts 38 and 39, which are disconnected when the switch is in the position illustrated but upon a sufficient rise in temperature in the heating chamber, which temperature is less than that required to cause switch 32 to tilt to open position, the switch 33 will be tilted to a position wherein the mercury element 37 closes the contacts 38 and 39.

A relay 40 is provided for controlling the operation of the motor 23 and the valve 16. Relay 40 comprises a coil 41, an armature 43 and arms 44, 45, and 46 which are actuated by said armature. Cooperating with arm 44 are contacts 47 and 48. Contacts 49 and 50 cooperate with the arms 45 and 46, respectively. Energization of coil 41 causes the arms 44, 45, and 46 to be moved into engagement with the contacts 48, 49, and 50, respectively. As will be later described, arm 46 closes a holding circuit through the coil 41 upon engagement with contact 50. Upon deenergization of coil 41, arm 44 will move into engagement with contact 47 and arms 45 and 46 will move out of engagement with their respective contacts. For energizing the relay 40 a step-down transformer 51 is provided, this transformer having a low voltage secondary 52 and a line voltage primary 53 connected by means of conductors 54 and 55 to lines 56 and 57 which are in turn connected to a suitable source of power (not shown).

Switches 60 and 61 are provided for controlling the summer-winter operation of the system. Switch 60 includes a switch blade 62 and the contact 63 and switch 61 includes a switch blade 64 and contact 65. When the switch blades are in the positions illustrated the system is set for winter operation. Upon moving switch blade 62 out of engagement with contact 63 and moving switch blade 64 into engagement with contact 65 the system will be set for summer operation as will be hereinafter set forth. Switches 60 and 61 will actually be placed close together and the respective switch blades 62 and 64 will be actuated by a single actuating member.

The zones to be heated are represented by the reference characters 100, 200, and 300, and while only three zones have been illustrated, it will be understood that as many zones may be controlled by my system as is desired. Warm air ducts 12, 13, and 14 communicate with warm air registers 101, 201, and 301, respectively, in the zones 100, 200, and 300. The register 101 is provided with a damper 102 pivoted at 103, said damper controlling the circulation of air through the zone 100. The registers in the other zones are likewise provided with similar dampers. Damper 102 is connected by suitable links 104, 105, to an arm 106 mounted on a shaft 107 of a motor 108. Energization of the motor 108 causes shaft 107 to rotate in a clockwise direction, thus effecting the opening of the damper 102. Upon deenergization of the motor 108, the arm 106 and the damper 102 are moved back to the position illustrated, by means of a biasing spring 109. Stops 110 and 111 limit the extent of movement of the arm 106. Damper motors 208 and 308 of similar construction located in the other zones control the respective dampers in those zones.

On the extremity of arm 106 is mounted a mercury switch 112, which switch includes a mercury element 113, and contacts 116, and 117. When the motor 108 is deenergized, the switch is in the position illustrated and contacts 116 and 117 are open. Upon energization of the motor 108 and rotation of shaft 107, the arm 106 causes the tilting of switch 112 to a position wherein the contacts 116 and 117 are closed by the element 113. Similar switches 212 and 312 are provided in the zones 200 and 300.

Located in the zone 100 is a thermostat generally indicated by the reference character 120, this thermostat including a bimetallic element 121 and arms 122 and 123 carried thereby. These arms cooperate with fixed contacts 124 and 125 and upon a fall in temperature of the space 100 arm 122 engages contact 124. This arm is spaced slightly nearer the contact 124 than is arm 123 with respect to the contact 125. Arm 122 is made flexible thus permitting the engagement of arm 123 with contact 125 after the temperature in the space falls a slight amount lower than the temperature at which arm 122 engaged the contact 124. The damper motor 108 is provided with terminals 127, 128, and 129. When terminals 128 and 129 are connected by engagement of arms 122 and 123 with contacts 124 and 125 the motor 108 will be energized and after both of arms move away from their respective contacts the motor will become deenergized. Suitable switch means are provided in said motor so that the motor will not become deenergized when arm 123 moves away from contact 125, a circuit being established through the motor by reason of the connection of terminals 127 and 129. The damper motor is continuously connected to a source of power through conductors 140 and 141, connected to lines 70 and 71 which are in turn connected to lines 56 and 57 and energization of the motor is dependent upon connecting terminals 128 and 129 as above described. The structure of this damper motor forms no part of the present invention and is accordingly not being illustrated in detail. It may, however, be of the type illustrated in the application of Sylvanus C. Shipley, Serial No. 65,274 filed Feb. 24, 1936, now Patent No.

2,169,168 dated Aug. 8, 1939. Similar thermostats 220 and 320 are provided in the zones 200 and 300, respectively. These thermostats control the damper motors 208 and 308 in the same manner as thermostat 120 controls damper motor 108, these damper motors being similarly connected to lines 56 and 57.

Switches 131, 231, and 331 located in the various zones are provided for causing the energization of damper motors 107, 207, and 307, respectively, if desired, when the temperatures of the zones are not low enough to cause the energization of the motor by means of the thermostats. Switch 131 comprises a switch blade 132 and contact 133 and the closing of this switch connects the contacts 128 and 129 together as will be apparent thus causing the motor 108 to become energized. Switches 231 and 331 are of similar construction and operate in the same manner.

Located in a zone in the building that is representative of the entire building, such as zone 200, is a thermostat 235. The zone in which this thermostat is located should preferably be selected so that its temperature will represent the average temperature of the entire building, although this is not absolutely essential. This thermostat may be of any well known construction wherein the setting automatically changes during certain predetermined periods, a suitable clock mechanism being provided and being connected to the fixed contacts of the thermostat to adjust them with respect to the movable contacts a predetermined amount at predetermined times. Since such thermostats are well known it has been deemed unnecessary to illustrate it in detail. However, it comprises a bimetallic element 236, contact arms 237 and 238 carried thereby and contacts 239 and 240 which are relatively fixed with respect to the arms 237 and 238. This portion of the thermostat is similar in construction to thermostat 100. A suitable clock mechanism 241 is provided for effecting the adjustment of contacts 239 and 240 by means of suitable mechanism, not illustrated, so that the thermostat will call for heat at different temperatures during different periods of the day.

*Operation*

With the switches 60 and 61 positioned as illustrated, the system is set for normal winter operation. It will be noted that the thermostat 235 is in its unsatisfied position, that is, the blades 237 and 238 are in engagement with their respective contacts 239 and 240 and the thermostat is calling for heat. Assuming the time of day to be the time that the building is occupied, the thermostat 235 will be set to a temperature which is higher than that which will normally be maintained in any of the rooms, for example, 80°. The thermostats 120, 220, and 320 will be set at the values which it is desired to maintain in the respective zones which may be, for example, 70°.

Should the temperature in any one of the zones, for example, zone 100 fall below 70°, or to a temperature wherein the blades 122 and 123 engage the contacts 124 and 125, the damper motor will be operated as previously described and will cause the damper 102 to move to open position and the switch 112 to be moved to a position wherein the contacts 116 and 117 are bridged by the mercury element 113. The moving of switch 112 to its closed position causes a circuit to be established through the relay coil 41 of relay 40, which circuit is as follows: from one side of the low voltage secondary 52 through conductors 150, 151, contacts 116 and 117 of switch 112, conductors 152, 153, 154 to contact 239 of thermostat 235 through the blades 237 and 238 of the thermostat to contact 240, conductors 155, 156 through the coil 41 and conductor 157 to the other side of the secondary 52. It should be noted that the circuit through the coil 41 of relay 40 is through the thermostat 235 so that this thermostat must be in its unsatisfied position in order for the individual zone thermostats to control the system during the daytime. It should also be noted that the switches 112, 212, and 312 are in parallel so that upon a closing of any one of these switches by reason of the corresponding thermostat calling for heat, a similar circuit will be established through the relay coil 41.

The energization of coil 41 causes arms 44, 45, and 46 to move into engagement with contacts 48, 49, and 50, respectively. The engagement of arm 45 with contact 49 causes a circuit to be established through the solenoid 19, which circuit is as follows: from the line 56 through conductors 160, 161, arm 45, contact 49, conductor 162, contact 63, switch arm 62 of switch 60, conductor 163, contacts 36 and 35 of switch 32, conductor 164 through the solenoid 19 and conductors 165 and 166 to the line 57. Energization of solenoid 19 causes valve 16 to be opened, as previously explained, whereupon fuel is supplied to the furnace and the temperature of the heating chamber thereof commences to rise.

After the temperature of the heating chamber has risen to a value high enough to cause switch 33 to tilt to its closed position, a circuit is established through the blower motor 23 as follows: from the line 56 through conductors 160, 167, contacts 38 and 39 of switch 33, conductor 168, contact 48, arm 44, conductor 169 to terminal 27 of the motor 23 through the motor to terminal 28 and conductors 170 and 166 to the line 57. It will now be apparent that motor 23 will operate as long as switch 33 is in its closed position and the relay 40 remains energized. Deenergization of the relay will cause arm 44 to move away from contact 48 thus stopping the motor 23. This deenergization of the relay 40 will take place only when all the zone thermostats are satisfied, that is, the arms thereof are out of engagement with their respective contacts thus causing the deenergization of the damper motors and the opening of the mercury switches controlled thereby.

Since the energizing circuits for the relay 40 all pass through the thermostat 235 it is apparent that should this thermostat be satisfied, the circuit through the relay 40 will be interrupted. Accordingly, should this thermostat be set at a low value, such as 60° when the other thermostats are set for 70°, it will be apparent that when the temperature surrounding the thermostat 235 rises above 60° the relay 40 will be deenergized, the circulation of air by the blower 22 and the supply of gas through the valve 16 will both be stopped. Accordingly when the proper time of day comes, the setting of the thermostat 235 will be automatically changed by the clock 241 and associated mechanism (not shown) and the system is then set for night operation. Since the zone thermostats are now set for a higher value than the thermostat 235, these zone thermostats will all be calling for heat so that their respective dampers are open. Whenever the temperature surrounding thermostat 235 drops below its setting a circuit will be established through the relay 40, as previously described, for the day operation whereupon the valve 16 will move to open position and blower 22 will be operated, assuming the temperature in the furnace is high enough so that switch 33 is in its closed position. As soon as the thermostat 235 becomes satisfied the relay 40 will be deenergized, valve 16 will be closed and motor 23 will stop. When the thermostat 235 is again automatically reset to maintain day operation, its contacts 239 and 240 will be shifted into engagement with blades 237 and 238 and since all the thermostats are now calling for heat, valve 16 will open and motor 23 will start operating until all of the zone thermostats have become satisfied.

In the summer-time, it is desirable to cause operation of motor 23 to circulate unheated air throughout any desired zones when the temperature rises to a predetermined high value. Switches 60 and 61 are moved to their opposite positions, that is, blade 64 of switch 61 is moved into engagement with contact 65, and blade 62 is moved out of engagement with contact 63. With the switches so adjusted motor 23 is caused to operate whenever the relay 40 is deenergized and arm 44 is in engagement with contact 47, the circuit for the motor being as follows: from the line 56 through conductor 175, switch arm 64, contact 65, conductor 176, contact 47, switch arm 44, conductor 169, to terminal 27 of the motor, through the motor to terminal 28 and conductors 170 and 166 to the line 57. In order to circulate air into any of the rooms, it is apparent that the dampers for those respective rooms must be opened, and for this purpose switches 131, 231, and 331 are provided. When switch 131 is moved to closed position it will be apparent that terminals 128 and 129 of the damper motor 108 are connected together independently of the thermostat 120 and the damper motor is energized and damper 102 moved to its open position. Switch 112 will of course be moved to its closed position at this time. If air is desired to be circulated through all the zones, all of the corresponding switches will be closed and if it is desired to circulate air through only certain zones, the switches for those zones will be closed. As long as any one of the damper motors is energized and the corresponding mercury switch is in its closed position it will be apparent that a circuit through the relay 40 will be established as long as thermostat 235 is in its unsatisfied position in which it is calling for heat, or more appropriately, calling for no more cooling. The control of the blower is under the thermostat 235 in its summer operation and this thermostat will accordingly be set so that cooling air will be circulated only when the temperature reaches a certain predetermined point for day and night operation. The opening of switch 60 causes the circuit through solenoid 19 to be interrupted even when the relay 40 is in its energized position.

Relay arm 46 forms a holding circuit for the relay 40 after it has moved into engagement with the contact 50 so that when the system is under the control of thermostat 235 either during the night-time or during the cooling season, the relay 40 will be energized until both arms 237 and 238 have moved out of engagement with their respective contacts 239 and 240. It will be understood that arm 237 engages its contact at a slightly higher temperature than that required to cause engagement of arm 238 with contact 240 so that upon this thermostat moving to its unsatisfied position relay 40 will not be energized until both arms have engaged their respective contacts. The holding circuit for the relay is now as follows: from one side of transformer secondary 52 through conductors 150, 151 to the mercury switch 112, assuming this switch to be closed at this time, conductors 152, 153, 154, contact 239, blade 237, bimetallic element 236, conductor 280, contact 50, arm 46, conductor 156, coil 41 and conductor 157 to the other side of secondary 52. Since this circuit is independent of the arm 238 on the thermostat 235, it will be apparent that the relay coil 41 will remain energized until arm 237 has moved out of engagement with contact 239, thus giving the proper operating differential.

The operation of the system in the summer-time under the control of the master thermostat 235 alone will be entirely satisfactory since this thermostat will be preferably placed in a portion of the building which is representative of the building as a whole and since the necessity for maintaining the temperature at a definite point is not as important as during the heating season. I am therefore able to provide for night operation of a zone control system and for summer operation of the system by the use of a single clock thermostat, thus avoiding the necessity of using a great amount of expensive equipment.

Having described a preferred form of my invention, it will be apparent to those skilled in the art that it is capable of certain modifications, and I wish it to be understood that my invention is limited only by the scope of the appended claims.

I claim as my invention:

1. In an all year air conditioning system, in combination, heating means including a fan for circulating air to a plurality of zones, control apparatus comprising a relay controlling the heating means and fan, means in each zone comprising a thermostat for controlling the flow of air to the zone, a master thermostat having timing means associated therewith, said thermostats in each zone individually controlling said relay dependently on said master thermostat and being operable upon a call for heat to cause said relay to assume a first position in which said heating means and fan are normally operated, said timing means being operable to relieve said zone thermostats of control and place said master thermostat in control of said relay, manual means for interrupting control of said heating means by said relay and for conditioning an electric circuit for starting said fan when said relay is in a second position opposite to said first position, said manual means including means associated with each of said zone thermostats for relieving it of control and causing the associated flow controlling means to admit air to the zones, and said master thermostat continuing to control said relay at substantially the same temperature when said zone thermostats have been manually relieved of control, and said fan operating when said relay is in its said second position.

2. In an all year air conditioning system, in combination, heating means including a fan for circulating air to a plurality of zones, control apparatus comprising a relay controlling the heating means and fan, the relay having a contact for normally starting the fan when the relay is energized, means in each zone for con- mostat and switch controlling said relay, a master thermostat in circuit with all said switches, timing means for periodically adjusting the set- trolling the flow of air thereto including a ther- ting of the master thermostat to a value below that of the zone thermostats whereby the master thermostat controls the system, manual means for interrupting control of the heating means by the relay and for preparing a circuit whereby said fan is energized when said relay is deenergized, said manual means including means associated with said means in each zone for conditioning individual zones for admission of air thereto and for closing said switches, said master thermostat controlling said relay when closure of said switches has been brought about by said manual means, said relay then causing said fan to operate upon denergization of the relay, and said timing means continuing to periodically adjust said master thermostat.

3. In an all year temperature regulating system, in combination, means for heating a fluid medium, circulating means for circulating said fluid medium to a plurality of zones, control apparatus comprising a relay controlling the heating means and the circulating means, means in each zone comprising a thermostat for controlling the flow of fluid to the zone, a master thermostat having timing means associated therewith, said thermostats in each zone individually controlling said relay dependently on said master thermostat and being operable upon a call for heat to cause said relay to assume a first position in which said heating means and circulating means are normally operated, said timing means being operable to relieve said zone thermostats of control and to place said master thermostat in control of said relay, manual means for interrupting control of said heating means by said relay and for conditioning an electric circuit for starting said circulating means when said relay is in a second position opposite to said first position, said manual means including means associated with each of said zone thermostats for relieving it of control and causing the associated flow controlling means to admit fluid to the zone, said master thermostat continuing to control said relay at substantially the same temperature when said zone thermostats have been manually relieved of control, and said circulating means operating when said relay is in its said second position.

4. In a system of the class described, a warm air furnace, an air conducting means connecting the heating chamber of said furnace and a plurality of zones whose temperature is to be controlled, a damper in each of said conducting means, an electrical motor for operating each of said dampers, a zone thermostat in each of said zones, electrical connections between each of said thermostats and its associated motor such that said thermostat causes said motor to move the damper positioned thereby to open position whenever the temperature in the respective zone falls below a predetermined value, a switch operated by each damper motor and moved to closed position whenever the respective damper motor is moved to a position wherein the damper is opened, a fan for circulating air through the heating chamber of the furnace and the conducting means to the various zones, a master thermostat in a selected zone, circuit means including said switches and said master thermostat operable to tend to cause operation of said heating means and said fan whenever the temperature in any one zone falls to the setting of the thermostat in that zone, timing means associated with said master thermostat and operative during predetermined periods to lower the setting of said master thermostat so as to relieve the zone thermostats of control and place said master thermostat in control of said heating means and fan, and manual means for conditioning said system for summer operation by interrupting control of said heating means by said zone and master thermostats and reversing the circuit connections between said master thermostat and said fan so that said fan is operated whenever the temperature is said selected zone is above the setting of said master thermostat, said manual means including means associated with each damper motor for causing said damper motor to move its respective damper to open position and to relieve the associated zone thermostat of control of said motor.

CLARENCE W. NESSELL.

CERTIFICATE OF CORRECTION.

Patent No. 2,235,620.  March 18, 1941.

CLARENCE W. NESSELL.

It is hereby certified that error appears in the printed specification of the above numbered patent requiring correction as follows: Page 4, second column, line 74, claim 2, strike out "trolling the flow of air thereto including a ther-" and insert the same after "con-" in line 70, same claim; page 5, second column, line 37, claim 4, for "is said" read --in said--; and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.